Nov. 24, 1936.  O. H. SCHULZ  2,061,637
SELF SERVE HOT PLATE
Filed June 22, 1936
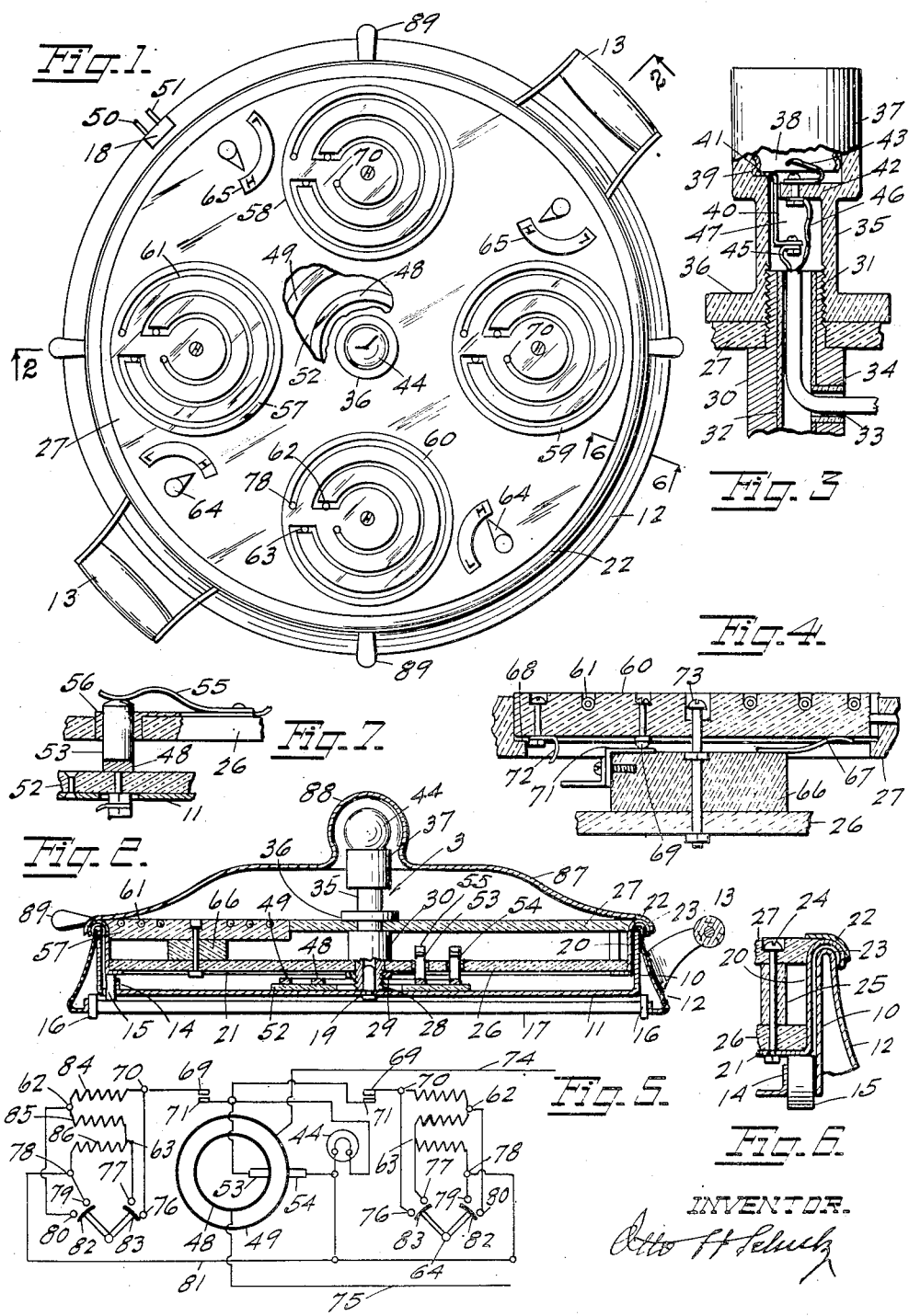
INVENTOR.
Otto H Schulz Patented Nov. 24, 1936

2,061,637

UNITED STATES PATENT OFFICE 2,061,637

SELF-SERVE HOT PLATE

Otto H. Schulz, Oakland, Calif.

Application June 22, 1936, Serial No. 86,543

8 Claims. (Cl. 219—19)

This invention, a self-serve hot plate, is intended for use directly on the table at meal time, providing means whereby diners may heat various foods and drinks to their individual desires, and which hot plate is rotatable for direct service from any of the heating units incorporated therein.

It is well known that various types of heating devices are in use, which are made for a specific operation, such as toasters and percolators, and also that hot plates are made with a plurality of burners.

This invention provides a heating and cooking device which is light in weight, ornamental, economical in construction and operation and easy to operate, and provides a plurality of heating units which are individually controllable at will as to heating and position relative to the diner.

The objects of the invention are as follows;

First; to provide a hot plate rotatable at will and having a plurality of heating units which are selectively movable for selective self-service.

Second; to provide a hot plate as outlined in which each heating unit can be individually controlled as to heating value.

Third; to provide a hot plate as outlined in which the entire heating or hot plate section can be removed from the base at will, for cleaning and repairs.

Fourth; to provide a device as outlined in which a pilot lamp indicates connection of the hot plate into circuit, and coincidently furnishes a source of illumination for the table.

Fifth; to provide switching means automatically making circuit to a heating unit when a container or other load is placed thereon, and automatically breaking the circuit when the container or load is removed.

Other objects and advantages of the invention will become apparent as the following description is read on the drawing forming a part of this specification, and in which similar reference characters are used to designate similar parts throughout the several views, of which;

Fig. 1 is a plan view of the invention with the cover removed and with a portion broken out to shown the collector rings.

Fig. 2 is a section taken on line 2—2 of Fig. 1.

Fig. 3 is an enlarged fragmentary section through the lamp socket, knob, and pivot head, with the upper portion of the socket shown in full line.

Fig. 4 is a sectional elevation through a modified form of heating unit and mounting therefor, provided with automatic circuit making and breaking means.

Fig. 5 is a wiring diagram showing the heat controls and automatic switches for two units as applied to the modification shown in Fig. 4.

Fig. 6 is a fragmentary sectional elevation shown on an enlarged scale, and taken on line 6—6 of Fig. 1.

Fig. 7 is a fragmentary sectional elevation showing the collector rings and brush, and the mounting and operating means therefor.

The frame or base consists of a cylindrical container having the cylindrical side wall 10 and bottom 11, and an encompassing flaring shell or casing 12, suitable handles 13 being secured to the shell 12 for carrying the hot plate. As shown, the container and casing are formed as a unitary structure.

The bottom 11 has ears 14 formed upwardly to support rollers 15 at a plurality of points, and rollers or feet 16 are also mounted on the foot 17 of the casing. A plug 18 is mounted through the walls of the container and casing for making electrical connection through the usual extension cord, (not shown).

A pivot pin 19 is axially secured in the container bottom 11.

The rotatable hot plate unit, or self-serve unit consists of a cylindrical housing 20 having an inturned annular flange 21 at the bottom, and an outwardly projecting top flange 22 overlapping the rim 23 of the casing.

Removably secured within the housing 20 as by screws 24 with intervening spacers 25 are spaced insulating plates consisting of a bottom plate 26 and a top plate 27, the screws 24 cooperating with the inturned bottom flange 21.

Axially and removably secured in the top and bottom insulating plates 27 and 26 is a combined spacer, pivot bearing, lifting knob, and lamp socket consisting of a bearing portion 28 having an axial bore rotatably receiving the pivot 19 and being externally threaded to receive the nut 29.

Above this bearing portion is the spacer portion 30 which is an enlargement terminating at its upper end in a reduced threaded portion 31 forming clamping means for the upper plate 27. An insulating sleeve 32 is pressed into the upper end of this member in an axial bore provided therefor, and a cord outlet 33 lined with an insulating sleeve 34 is formed through the wall of the spacer 30 and communicates with the interior of the insulating sleeve 32.

The lifting knob consists of a body 35 terminating at its lower end in an annular flange or top plate clamping member 36, and at its upper end in a knob 37, by means of which the rotatable hot plate unit may be removed at will from the base or casing.

This lifting knob is formed of insulating material and has an axial bore 38 in which is fixed a threaded lamp socket 39 terminating at its lower end in a lead or terminal 40 forming one connecting terminal for an electric cord, a hole 41 being formed through the central wall 42 for passage of the terminal or lead 40.

A center contactor 43 is secured to the central wall 42 for the tip connection of the lamp 44 and the respective conductors 45 and 46 are electrically connected to the respective terminals 40 and 43, and an axial bore 47 is formed in the lower portion of the knob and threaded to receive the threaded portion 31 of the spacer and clamp member.

Fixedly secured to the top surface of the bottom 11 is an insulating ring 52 upon which is mounted concentric to the axis, a pair of collector rings, respectively 48 and 49 which are respectively electrically connected to the plug terminals 50 and 51.

Current collecting brushes 53 and 54 are urged by spring 55 to contact the rings 48 and 49, and are slidably mounted in suitable sleeves 56 secured in the lower insulating plate 26, the conductive bushings 56 and springs 55 being electrically connected and forming terminals for the collected current. It will be noted that the rings and brushes may be readily reversed, with the rings mounted on the under surface of the bottom plate 26, and the brushes mounted in the bottom 11, and there may be a slight advantage in this arrangement since the rings and brushes will not be subjected to so much heat.

Since there are no positive connections of any kind between the base and rotatable unit, the rotatable unit may be removed from the base at will without requiring any disconnections of any kind, thus facilitating cleaning and repairs.

Removably mounted in the top insulating plate 27 is a plurality of equiangularly spaced heating units 57, 58, 59 and 60, each of which has a heating element 61 tapped at a plurality of points 62, 63, for series and parallel connection for controlling the heat at will through the agency of switches 64, each of which is provided with an indicator 65. These units are preferably mounted on spacers 66, or in the modified manner shown in Fig. 4.

In the modification shown in Fig. 4, the heating units, as 60, are depressibly mounted on springs 67, depressable to seat on the annular shoulder 68, and a contactor 69 is electrically connected to the terminal 70 of the unit, whereby, when a vessel or other device to be heated, (not shown), is placed on the unit, the unit is depressed by the weight of the vessel, making contact through 69 to the terminal 71, and when the vessel is removed, the springs 67 raise the heating unit and break the contact. The other terminal and intermediate connections for heat control are taken off as indicated at 72, the axial securing member 73 permitting sufficient raising and depression of the unit to make and break contact.

The wiring diagram, Fig. 5 includes the automatic or load actuated, circuit making and breaking means for the individual units, and shows a switching arrangement for series and parallel circuits to provide two different heats, although more heats can be arranged, if desired.

The line wire or power supply connections 74 and 75 are connected to the respective bayonet plug members 50 and 51 through the usual appliance cord, and may be considered as the respective wires of the appliance cord. The plug members 50 and 51 are electrically connected to the collector rings 48 and 49. Brushes 53 and 54 cooperate with the collector rings and are connected directly across the lamp 44 as shown.

Brush 53 is also connected to all of the contacts 71, and contacts 69 are each connected to the terminal 70 of its associated heating unit and to a switch contact 76. Tap 63 is connected to a second switch contact 77, terminal 78 to a third contact 79, and tap 62 to a fourth contact 80, terminal 78 being also connected through wire 81 to brush 54, thence through ring 49 to line wire 74. Brushes 82 and 83 are insulated from each other and make circuit across the respective contacts for parallel connection, and when out of contact, the sections of each heating unit are connected in series.

In the position shown in the wiring diagram, when a unit is depressed by the weight of a vessel placed thereon, a circuit is completed through 69 and 71 and current flows through wire 75, ring 48, brush 53, contact 71 to 69, contact 76, brush 83, contact 77, and in parallel therewith, through terminal 70, through the three divisions 84, 85, 86 in parallel, thence through terminals 62 and 78 to contacts 79 and 80 and brush 82, thence through wire 81 to brush 54, ring 49, and line wire 74.

If knob 64 is rotated to clear all contacts 76, 77, 79 and 80 while a vessel is resting on the unit, current will flow through line 75, ring 48, brush 53, contacts 71, 69, terminal 70, through 84, 85, 86 in series, wire 81, brush 54, ring 49, wire 74.

The cover 87 has a combined lifting knob and lamp guard 88, and the peripheral edge of the cover is formed to fit over the flange 22, protecting the unit from dust and dirt and providing an artistic effect.

Handles 89 are mounted in the rotatable unit side wall flange for selective self-service from the individual heating units.

It will be understood that variations in construction and arrangement of parts, which variations are consistent with the appended claims, may be resorted to, without detracting from the spirit or scope of the invention, or sacrificing any of the advantages thereof.

I claim:

1. In combination, a casing, a hot plate including a plurality of heating units and rotatably mounted in said casing, a heating circuit and a lighting circuit, means for rotating said hot plate, current control means for each unit, said hot plate being freely removable at will from said casing, disrupting said circuits on removal and completing said circuits on replacement, and a combined removal knob and lamp socket axially mounted on said hot plate.

2. In combination, a casing, a hot plate rotatably mounted in said casing and freely removable at will and including a plurality of heating units and heat control means for each unit, a circuit for said hot plate and circuit making and breaking means associated with each unit actuated by depression and release of the unit, and means disrupting said circuit to said hot plate when said hot plate is removed from said casing, and restoring circuit when said hot plate is replaced.

3. In combination, a casing, a hot plate including a plurality of heating units and rotatably mounted in said casing, a circuit for said hot plate, and circuit making and breaking means actuated by depression and release of a unit, and selective heat control means, associated with each unit, said hot plate being freely removable from said casing at will, disrupting said circuit to said hot plate upon removal and restoring said circuit upon replacement, and means for removing said hot plate.

4. A hot plate comprising a casing and a hot plate rotatably mounted therein, axial positioning means and circumferential roller supporting means for said hot plate, a plurality of heating units mounted in said hot plate and a heating circuit for each unit, and means for rotating said hot plate, and a heat control switch associated with each unit, said hot plate being freely removable at will, and including means for removal thereof, and means disrupting the heating circuits on removal and restoring the heating circuits on replacement of said hot plate.

5. A self-serve hot plate comprising a casing and a hot plate rotatably mounted therein, axial positioning means and circumferential supporting means for said hot plate, a plurality of heating units mounted in said hot plate, and a heating circuit for each heating unit, a heat control switch associated with each unit, each heating unit being resiliently mounted, a circuit making and breaking switch associated with each unit actuated by depression and release of the unit, said hot plate being freely removable at will from said casing and including means for removal thereof, and means disrupting said heating circuits to said hot plate upon removal from said casing and restoring said heating circuits upon replacement.

6. A self-serve hot plate comprising a casing, a hot plate section axially pivoted in said casing, annularly located roller supports for said hot plate section, a plurality of heating units mounted in said hot plate section, individual heat control means for each unit, and a handle for rotating said hot plate section mounted in associated relation to each unit.

7. A self-serve hot plate comprising a casing having a bottom, a hot plate section fitting within said casing and having a plurality of heating units mounted therein, and individual heat control means for each unit, an axial pivot fixed in said bottom, top and bottom insulating plates for said hot plate section, rollers annularly supporting said hot plate section, a pivot bearing in said hot plate section terminating at its upper end in a combined knob for removal of said hot plate section, and lamp socket, current collecting means cooperating between said bottom and said bottom plate.

8. A self-serve hot plate comprising a casing having a bottom, a hot plate section rotatably fitting within said casing and having a plurality of heating units mounted therein, and individual heat control means for each unit, an axial pivot fixed in said bottom, top and bottom insulating plates for said hot plate section, rollers annularly supporting said hot plate section, current collecting means cooperating between said bottom and said bottom plate, an axial member for said hot plate section coincidently forming a pivot bearing, spacing and clamping means for said top and bottom plates, a knob for removal of said hot plate section at will and a lamp socket formed in said knob, resilient mounting means for each unit, and a make and break switch associated with each unit making circuit upon depression of the unit and breaking circuit upon release thereof.

OTTO H. SCHULZ.